(12) United States Patent
Darbari et al.

(10) Patent No.: US 8,649,573 B1
(45) Date of Patent: Feb. 11, 2014

(54) METHOD AND APPARATUS FOR SUMMARIZING VIDEO DATA

(75) Inventors: Abhinav Darbari, Hyderabad (IN); Mike Iampietro, San Francisco, CA (US); Abhishek Shah, Delhi, IN (US); Arvinder Singh, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 430 days.

(21) Appl. No.: 12/814,845

(22) Filed: Jun. 14, 2010

(51) Int. Cl.
*G06K 9/00* (2006.01)
*G06K 9/36* (2006.01)

(52) U.S. Cl.
USPC ............................. 382/118; 382/286; 382/224

(58) Field of Classification Search
None
See application file for complete search history.

(56) References Cited

U.S. PATENT DOCUMENTS

| | | | |
|---|---|---|---|
| 8,254,752 B2 * | 8/2012 | Ryu | 386/241 |
| 8,379,098 B2 * | 2/2013 | Rottler et al. | 348/211.6 |
| 2004/0189876 A1 * | 9/2004 | Shirato | 348/700 |
| 2006/0251384 A1 * | 11/2006 | Vronay et al. | 386/52 |
| 2007/0143778 A1 * | 6/2007 | Covell et al. | 725/19 |
| 2009/0087037 A1 * | 4/2009 | Wada | 382/118 |
| 2009/0110247 A1 * | 4/2009 | Kim | 382/118 |
| 2009/0169168 A1 * | 7/2009 | Ishikawa | 386/52 |
| 2010/0142762 A1 * | 6/2010 | Morita | 382/115 |

* cited by examiner

*Primary Examiner* — Matthew Bella
*Assistant Examiner* — Thomas Conway
(74) *Attorney, Agent, or Firm* — Moser Taboada (57) ABSTRACT

Method and apparatus for summarizing video data is disclosed. In one embodiment, a method includes accessing face information that is associated with at least one identified person within frames of the video data, examining user specifications for selecting portions of the video data, comparing the user specifications with the face information to determine indicia of interest related to each of the frames, identifying at least one of the frames that are in accordance with user specifications based on the indicia of interest and forming summary video data using the at least one identified frame of the video data.

20 Claims, 7 Drawing Sheets

METHOD AND APPARATUS FOR SUMMARIZING VIDEO DATA

BACKGROUND

1. Technical Field

Embodiments of the present application generally relate to multimedia processing and editing systems and, more particularly, to a method and apparatus for summarizing video data.

2. Description of the Related Art

Because of the ongoing proliferation of multimedia capturing devices (e.g., image data/video data recording devices) within society, advancements in multimedia processing technology (e.g., image data/video data editing systems) progressed immensely in recent times. Conventional video data editing software (i.e., ADOBE® PREMIERE® ELEMENTS where PREMIERE is a registered trademark of Adobe Systems Incorporated of San Jose, Calif.) can be used to cut a video sequence at various positions and rearrange the frame ordering. Such software also removes frames from and/or adds frames to any position within the video sequence. The video data editing software also identifies various content (i.e., objects or people) within the frames of the video sequence. This may be performed automatically by the video data editing software or manually by a user. For example, the user selects a person and annotates the video sequence with corresponding identity data (i.e., a name).

The video data editing software deletes some frames and stores other frames as a summary of the original video sequence. The video data editing software automatically summarizes the video sequence using various data extracted from the frames of the video sequence, such as motion information and/or quality information, but not of the content identified within the frames. Unfortunately, the conventional video data editing software is limited to implementing summarization technologies that cannot identify frames of interest for the summary based on content that is desired by the user. The video data editing software cannot be used to retain frames having the desired content while discarding any frames having unnecessary or extraneous content. For example, the video data editing software cannot select frames that feature certain individuals.

Therefore, there is a need in the art for an improved method and apparatus for summarizing video data.

SUMMARY

Embodiments of the present disclosure generally include a method and apparatus for summarizing video data. In some embodiments, a computer implemented method for summarizing video data includes accessing face information that is associated with at least one identified person within frames of the video data, examining user specifications for selecting portions of the video data, comparing the user specifications with the face information to determine indicia of interest related to each of the frames, identifying at least one of the frames that are in accordance with user specifications based on the indicia of interest and forming summary video data using the at least one identified frame of the video data.

While the method and apparatus for summarizing video data is described herein by way of example for several embodiments and illustrative drawings, those skilled in the art will recognize that the method and apparatus for summarizing video data is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for partial encryption of frame-based electronic content as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for summarizing video data are described. Some of these embodiments enable intelligently browsing of video sequences as well as any other multimedia data application that uses face information. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
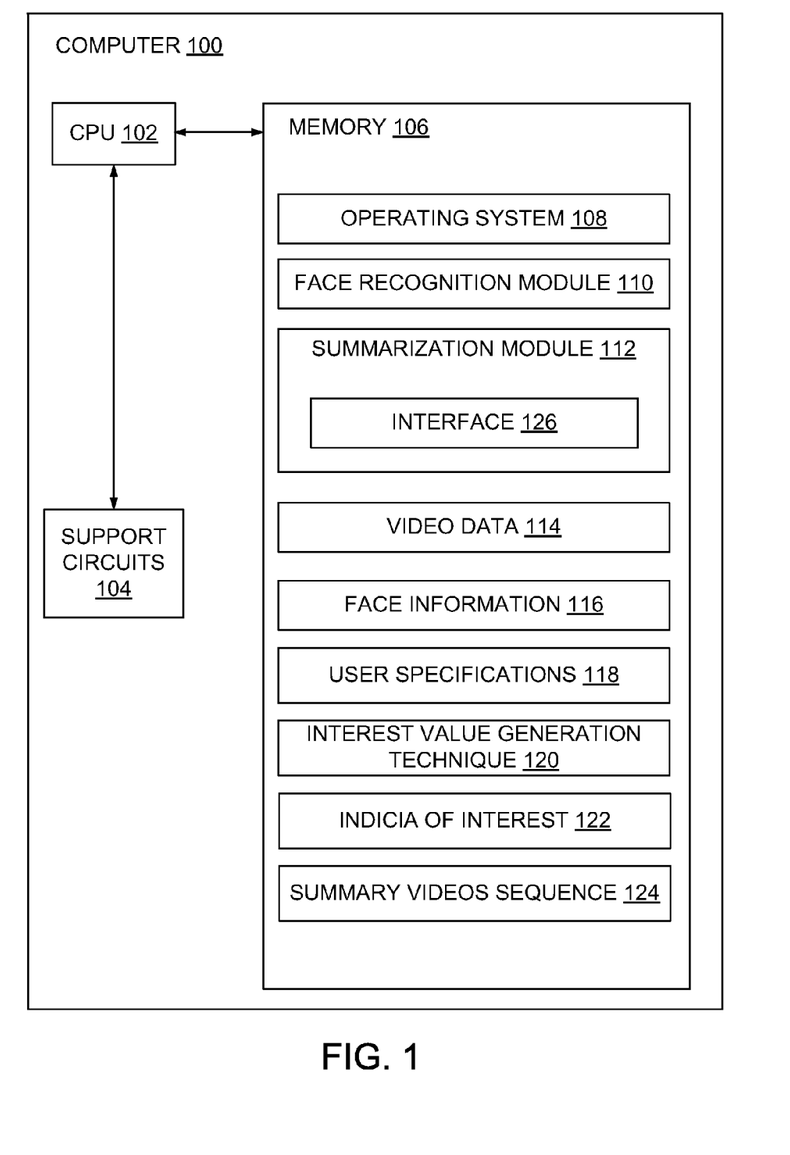
FIG. 1 depicts a block diagram of apparatus for summarizing video data according to one or more embodiments.

FIG. 1 depicts a block diagram of a computer 100 for summarizing video data according to one or more embodiments. The computer 100 is a type of computing device (e.g., a laptop, a desktop, a Personal Digital Assistant (PDA) and/or the like) known to one of ordinary skill in the art having the benefit of this disclosure. The computer comprises a Central Processing Unit (CPU) 102, various support circuits 104 and a memory 106. The CPU 102 may comprise one or more commercially available microprocessors or microcontrollers that facilitate data processing and storage. Various support circuits 104 facilitate operation of the CPU 102 and may include clock circuits, buses, power supplies, input/output circuits and/or the like. The memory 106 includes a read only memory, random access memory, disk drive storage, optical storage, removable storage, and the like. The memory 106 includes an operating system 108 as well as various software packages, such as a face recognition module 110 and a summarization module 112. The memory 106 includes various data, such as video data 114, face information 116, user specifications 118, an interest value computation technique 120, indicia of interest 122 and a summary video sequence 124. The video data 114 generally includes one or more video sequences in which each sequence includes one or more frames.

The operating system 108 generally manages various computer resources (e.g., network resources, data storage resources, file system resources and/or the like). The operating system 108 is configured to execute operations on one or more hardware and/or software devices, such as Network Interface Cards (NICs), hard disks, virtualization layers, firewalls and/or the like. For example, the various software packages call commands associated with the operating system 108 (i.e., native operating system commands) to perform various file system and/or storage operations, such as creating files or metadata, writing data to the files, reading data from the files, modifying metadata associated with the files and/or the like. The operating system 108 may call one or more functions associated with device drivers to execute various file system and/or storage operations.

The face recognition module 110 (e.g., an image/video face recognition feature of ADOBE® PREMIERE® ELEMENTS) includes software code (e.g., processor-executable instructions) for identifying an individual person within one or more frames of a video sequence based on unique characteristics (i.e., facial features, such as a distance between the eyes). When applied to the video data 114, the face recognition module 110 identifies one or more people and subsequently creates the face information 116 for each face appearance within the frames. For each identified person, the face recognition module 110 stores various attributes associated with the face as represented in a particular frame. In some embodiments, the face recognition module 110 annotates each frame of the video data 114 with such facial attributes, which are stored as metadata that is internal to the face recognition module 110.

In some embodiments, the face information 116 includes a frame number, identity data and one or more facial attributes for each person that is identified within each of the frames. A particular having a person of interest may be annotated with facial attributes that includes position information, motion information (e.g., velocity data), a size, an entry frame number and/or the like. As explained further below, these facial attributes are used to determine interest values based on the interest value generation technique 120.

In some embodiments, the user specifications 118 are communicated to the summarization module 112 for the purpose of selecting portions of the video data 114 and creating the summary video sequence 124. The user specifications 118 identify one or more persons of interest of whom at least a portion (e.g., one or more frames) of the summary video sequence 124 is to include. The person of interest is selected amongst the people identified within the video data 114. A user may select these persons of interest by identifying their corresponding faces as displayed on a particular frame. For example, the user may select a birthday child to be a person of interest in a video of the birthday celebration.

The user specifications 118 may also define degrees associated with the persons of interest. The user may define a person of high interest as well as one or more people of low interest such that the summary video sequence 124 includes more frames having the person of high interest. In the example mentioned above, the user may select the birthday child as a person of high interest and one or more closest friends as people of low interest. The user desires the summary video sequence 124 that focuses the birthday child and his/her interactions with any of the closest friends instead of anyone other person that is identified within the video data 114.

In addition, the user specifications 118 may define content to exclude from the summary video sequence 124, such as one or more of the identified people. Frames having one or more excluded persons are not likely to be selected unless such frames also feature one or more persons of interest as well. For example, the user may desire that a teacher of the birthday child be excluded from the summary video sequence 124. Frames having the excluded teacher may be removed and not used for forming the summary video sequence 124.

In some embodiments, the user specifications 118 define a time duration or length of the summary video sequence 124. In order to meet the user-defined duration, a sufficient number of frames are identified within the video data 114 that best conform to the user specifications 118. These frames are then used to form the summary video sequence 124. As explained further below, the user-defined duration is used to compute a threshold for selecting frames having at least a certain interest value.

The summarization module 112 includes software code (e.g., processor-executable instructions) that is stored in the memory 106 and executed by the CPU 106. The summarization module may include an interface 126 for receiving and processing the user specifications 118 as described in the description for FIG. 2. The summarization module 112 compares the user specifications 118 with the face information 116 to determine the interest of indicia 122. In some embodiments, the summarization module 112 implements the interest value generation technique 120 to produce interest values for each frame.

The interest value generation technique 120 refers to a procedure for comparing the user specifications 118 with the face information 116. In some embodiments, the interest value generation technique 120 includes a base value for each person that is identified within the video data 114. Base values for people of interest are higher than people of no interest or people to exclude. Therefore, frames that include any of the people of interest are more likely to be used for the summary video sequence 124.

In some embodiments, the interest value generation technique 120 also includes one or more modifiers (e.g., multipliers) for these base values. Each modifier is expressed in terms of one or more facial attributes associated with people that are indentified within a particular frame. Such a modifier may be a dynamic multiplier that is determined using values for these facial attributes. For each person of interest, the dynamic multiplier is applied to a corresponding base value. Then, these values are aggregated into an interest value for the particular frame.

In some embodiments, the interest value generation technique 120 includes multipliers that are based on size data, position information, motion information and/or temporal information. For example, a given multiplier may be defined using a ratio (i.e., a percentage) between an area of a face and a total area of the particular frame such that larger faces receive higher multipliers. Another multiplier may be defined using a distance from the face to a center of the particular frame. Faces that are further away from the center are provided higher multipliers than closer faces. Yet another multiplier may be defined using velocity data associated with the face, where larger deviations between a face velocity and an average velocity correspond with higher multipliers. As another example, a particular multiplier may be based on temporal data and therefore, assign more importance to a face that appears in a middle of a video sequence than at a beginning or an end.

In some embodiments, the indicia of interest 122 includes an interest value for each of the frames within the video data 114. Based on the user-defined duration for the summary video sequence 124, the summarization module 112 determines a threshold for identifying frames in accordance with the user specifications 118. For example, if the user desires a fifteen minute summary of a three hour video, the summarization module 112 selects at least fifteen minutes worth of frames that have the highest interest values when compared to the threshold. Any frame having an interest value that exceeds the threshold is used to form the summary video sequence 124. On the other hand, any frame having an interest value that falls below this threshold is excluded from the summary video sequence 124 and/or removed from the video data 114.

Figure 2:
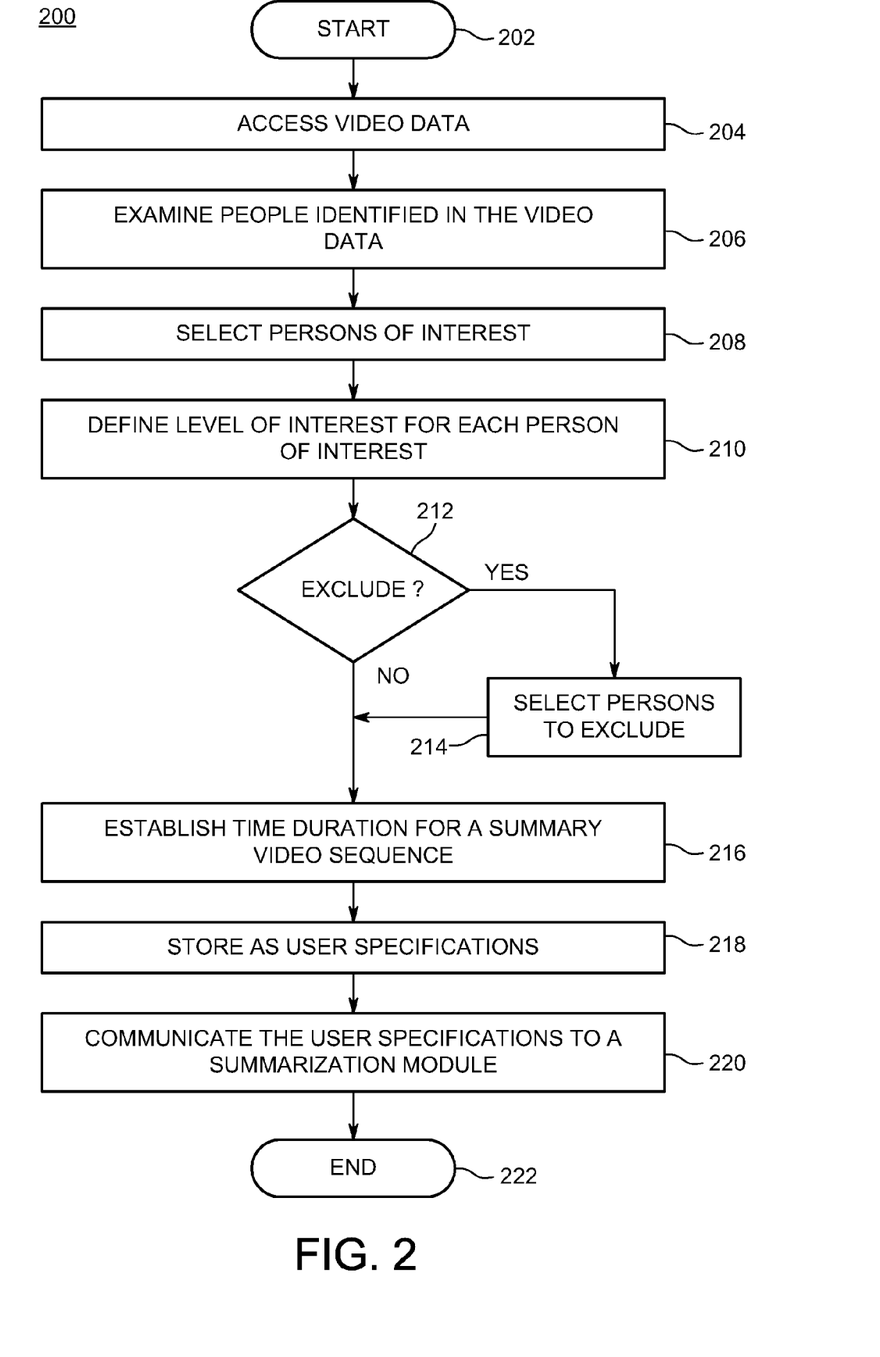
FIG. 2 depicts a flow diagram of a method of producing user specifications according to one or more embodiments.

FIG. 2 depicts a flow diagram of a method 200 of producing user specifications according to one or more embodiments. The method 200 starts at step 202 and proceeds to step 204. In some embodiments, each and every step of the method 200 is performed by an interface for a summarization module. In other embodiments, some of these steps may be omitted or skipped.

At step 204, the method 200 accesses video data. At step 206, people that are identified in the video data are examined. For example, the user may review images of these people that are found within one or more frames. At step 208, the method 200 selects persons of interest. At step 210, a degree of interest is defined for each person of interest. At step 212, the method 200 determines whether there are any people to be excluded from the summary video sequence. If the user desires to exclude certain persons, the method 200 proceeds to step 214. At step 214, the method 200 selects one or more persons to exclude. If, on the other hand, the user does not desire to exclude anyone, the method 200 proceeds to step 216. At step 216, a time duration is established for the summary video sequence. At step 218, the method 200 stores the time duration, the persons of interest and/or the persons to exclude as user specifications. At step 220, the method 200 communicates the user specifications to the summarization module. At step 222, the method 200 ends.

Figure 3:
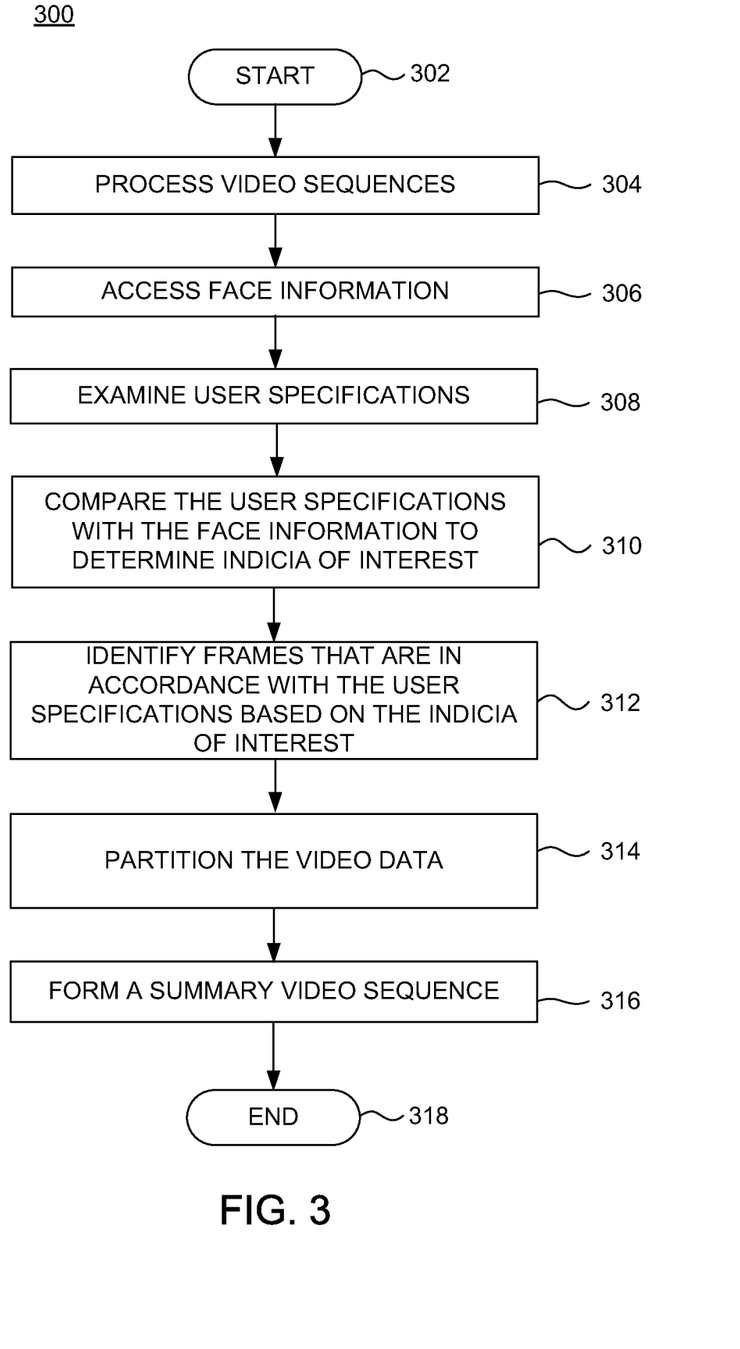
FIG. 3 depicts a flow diagram of a method for summarizing video data according to one or more embodiments.

FIG. 3 depicts a flow diagram of a method 300 of summarizing video data according to one or more embodiments. The method 300 starts at step 302 and proceeds to step 304. In some embodiments, each and every step of the method 300 is performed by a summarization module. In other embodiments, some of these steps may be omitted or skipped.

At step 304, user selections of one or more video sequences are received and processed. As mentioned in the presented disclosure, the one or more video sequences form the video data to be summarized. At step 306, face information that is associated with at least one identified person is accessed. The face information may include a frame number, identity data and various facial attributes associated with each face appearance. As mentioned in the description for FIG. 1, a face recognition module (e.g., the face recognition module 110 of FIG. 1) annotates the selected video sequences with the face information prior to access by the summarization module.

At step 308, user specifications for selecting portions of the video data are examined. In some embodiments, the summarization module receives the user specifications and extracts various data prescribing content that is to be included within the summary video sequence, as explained in the present disclosure. For example, the user specifications may indicate one or more persons of interest as well as define a maximum time duration for an entire summary video sequence. The user specifications may also include one or more persons of no interest that are to be excluded from the summary video sequence.

At step 310, the user specifications are compared with the face information to determine indicia of interest related to each of the frames. The indicia of interest refer to an amount of desired content within a certain frame. A detailed description of the process for creating the indicia of interest is provided with reference to FIG. 4 below. At step 312, one or more of the frames are identified to be in accordance with user specifications based on the indicia of interest. Frames having a significant amount of the desired content are likely to be used to form the summary video sequence. At step 314, the video data is partitioned into the identified frames and one or more excluded frames. As explained below, the one or more excluded frames may include undesired content, such as one or more persons. At step 316, a summary video sequence is formed using the identified frames. At step 318, the method 300 ends.

Figure 4:
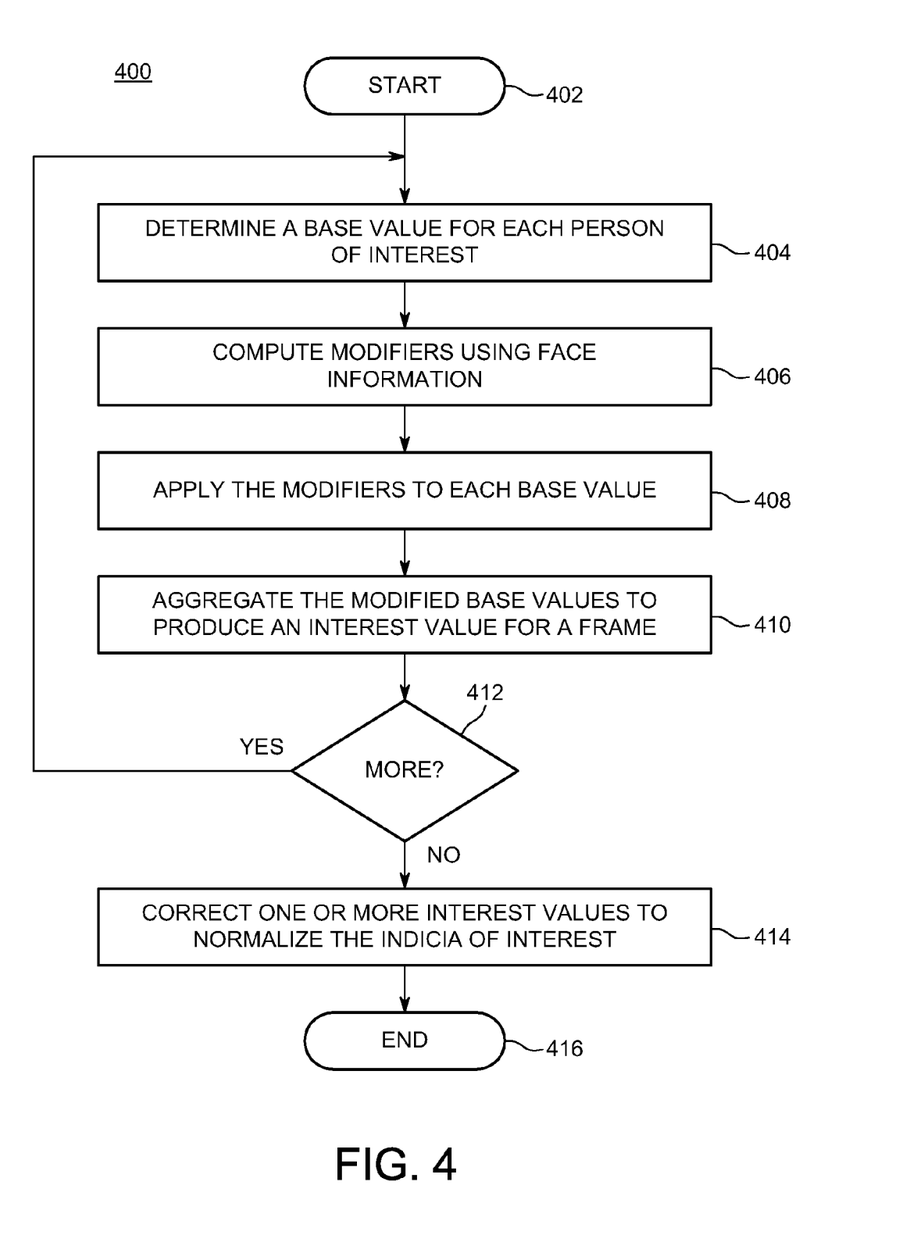
FIG. 4 depicts a flow diagram of a method for comparing user specifications to face information to determine indicia of interest according to one or more embodiments.

FIG. 4 depicts a flow diagram of a method 400 of determining indicia of interest related to each frame of video data according to one or more embodiments.

At step 404, a base value is determined for each person of interest in a frame. Optionally, a base value for each person to be excluded is also determined. Such a base value is configured to be large enough to significantly reduce any resulting interest value for the frame. Furthermore, the base scores may vary due to different degrees in interest to the user. For example, a base score for a person of high interest is greater than a person of low interest.

At step 406, one or more modifiers are computed using facial attributes associated with each person of interest. Certain facial attributes, such as size data, motion information, position information and/or temporal data, are used to create the one or more modifiers. In some embodiments, the method 400 computes a weight or a multiplier associated with a particular facial attribute in order to modify the base value. The modified base value now accounts for a lack of or a presence of the particular facial feature. For example, the method 400 increases a base value for a person if his/her face is extremely large in a given frame. At step 408, the one or more modifiers are applied to each base value for the frame. At step 410, the modified base values are aggregated into an interest value of the entire frame.

At step 412, the method 400 determines whether there are more frames for which interest values are to be computed. If there are more frames within the video data to process, the method 400 returns to step 404. In some embodiments, steps 404-412 are repeated for each frame within the video data. If, on the other hand, there are no more frames in the video data, the method 400 proceeds to step 414.

At step 414, one or more interest values are corrected. In some embodiments, erroneous interest values are corrected in order to normalize the indicia of interest with respect to outliers. An outlier may exist when a person of interest in not recognized in a given frame resulting in an interest value that is significantly lower than any surrounding frame. For example, such an erroneous interest value is replaced by an interest value of one of the surrounding frames. Averaging interest values from two or more surrounding frames may also be used to correct the erroneous interest value. In addition, computing a weighted average of interest values for one or more contiguous frames may also be used to correct the erroneous interest value. At step 416, the method 400 ends.

Figure 5:
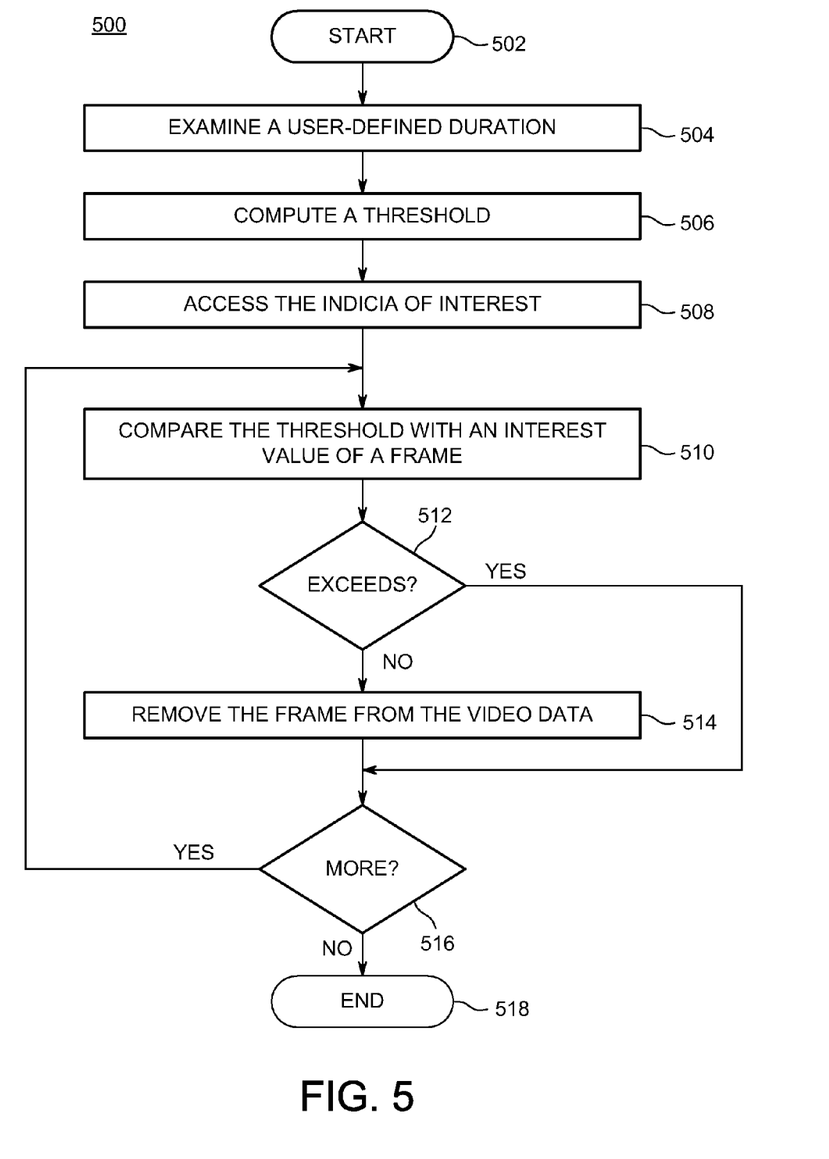
FIG. 5 depicts a flow diagram of a method for identifying frames that are in accordance with user specifications based on indicia of interest according to one or more embodiments.

FIG. 5 is a flow diagram of a method 500 for identifying frames that are in accordance with user specifications based on indicia of interest according to one or more embodiments.

The method 500 starts at step 502 and proceeds to step 504. At step 504, a user-defined duration is examined. As explained in the detailed description for FIG. 1, a user defines a maximum time length for a summary video sequence in user specifications that are communicated to a summarization module. At step 506, the method 500 computes a threshold. In some embodiments, the threshold includes an interest value for identifying frames to include in the summary video sequence. Accordingly, the method 500 determines the threshold of which the frames that exceed the threshold form the summary video sequence that is less than or equal to the user-defined time duration.

At step 508, the indicia of interest is accessed. At step 510, the threshold is compared with an interest value of a frame. In response to such a comparison, the frame may be removed from the video sequence or used to form the summary video sequence. At step 512, a determination is made as to whether the interest value exceeds the threshold. If the interest value falls below the threshold, the method 500 proceeds to step 514. At step 514, the frame is removed from the video sequence. For example, such a frame may include one or more persons to be excluded from the summary video sequence.

If, on the other hand, the interest value exceeds the threshold, the method 500 proceeds to step 516. Accordingly, the frame is to be retained and used to form the summary video sequence. At step 516, a determination is made as to whether there are more frames in the video data. If there are more frames, the method 500 returns to step 510 where steps 508 to 516 are repeated for another frame. If there are no more frames, the method 500 proceeds to step 518. The method 500 stores the resulting summary video sequence as a summary video file. At step 518, the method 500 ends.

Figure 6:
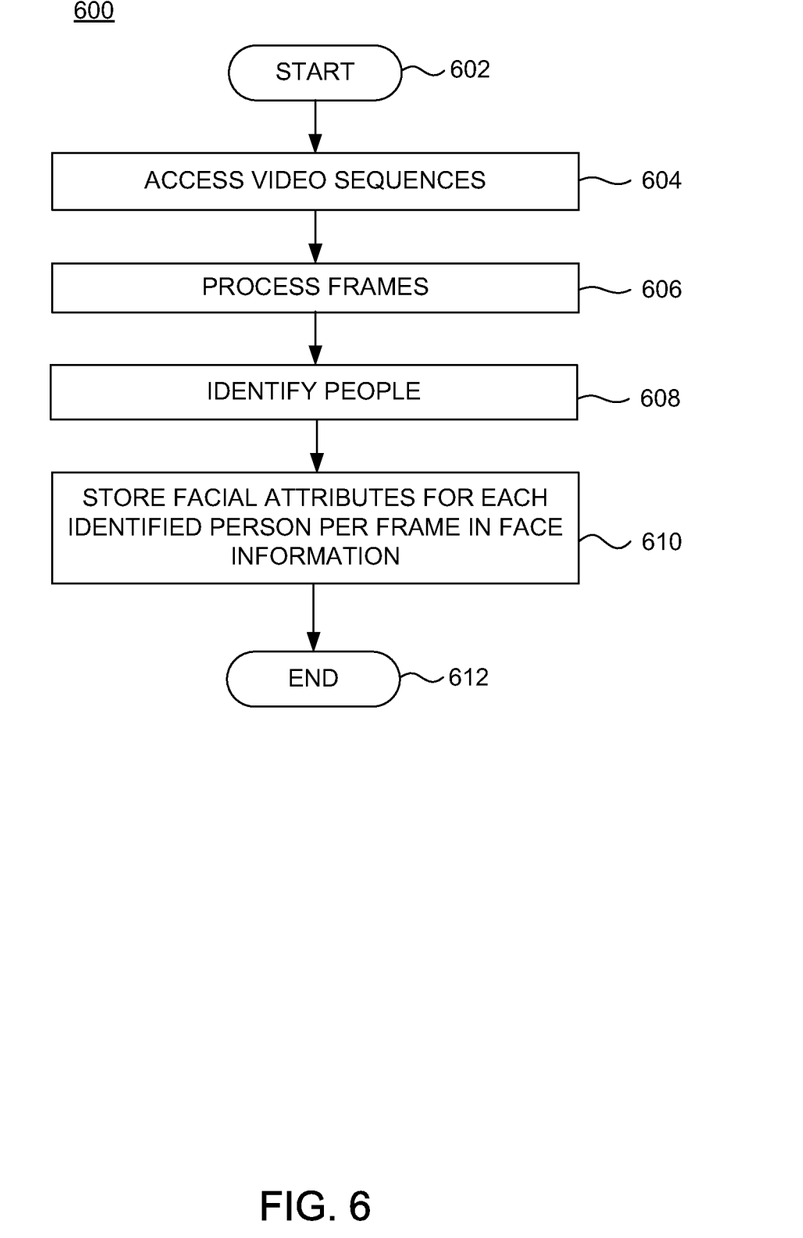
FIG. 6 depicts a flow diagram of a method for creating face information according to one or more embodiments.

FIG. 6 depicts a flow diagram of a method 600 for annotating video data with face information. The method 600 starts at step 602 and proceeds to step 604. In some embodiments, each and every step of the method 600 is performed by a face recognition module. In other embodiments, some of these steps may be omitted or skipped.

At step 604, the method 600 accesses one or more video sequences. At step 606, one or more frames are processed. At step 608, one or more people are identified. In some embodiments, the face recognition module uses unique facial characteristics, such as a distance between the eyes, to identify individual people within a given frame. The face recognition module annotates the given frame with information describing each person. For example, a user may use the face recognition module to identify one person as a birthday child and another person as a close friend. Subsequently, the method 600 associates these people with various facial attributes, such as size, position information, temporal data and motion information. For example, the face recognition module may annotate the birthday child with velocity data indicating various level of movement. The user may desire a summary video sequence highlighting lots of movement for the birthday child. As such, the summarization module selects frames having such a high level of activity. At step 610, the method 600 stores these facial attributes for each identified person per frame as face information. At step 612, the method 600 ends.

Example Computer System for Summarizing Video Data

Various embodiments of a method for summarizing video data, as described herein, may be executed on one or more computer systems, which may interact with various other devices. One such computer system is computer system 700 illustrated by FIG. 7, which may in various embodiments implement any of the elements or functionality illustrated in FIGS. 1-6. In various embodiments, computer system 700 may be configured to implement the computer 100 described above. While the illustrated system demonstrates computer system 700 implementing the interest value generation technique 120, computer system 700 may be used to implement any other system, device, element, functionality or method of the above-described embodiments. In the illustrated embodiments, computer system 700 may be configured to implement the summarization module as processor-executable executable program instructions 722 (e.g., program instructions executable by processor(s) 710 a-n) in various embodiments.

Figure 7:
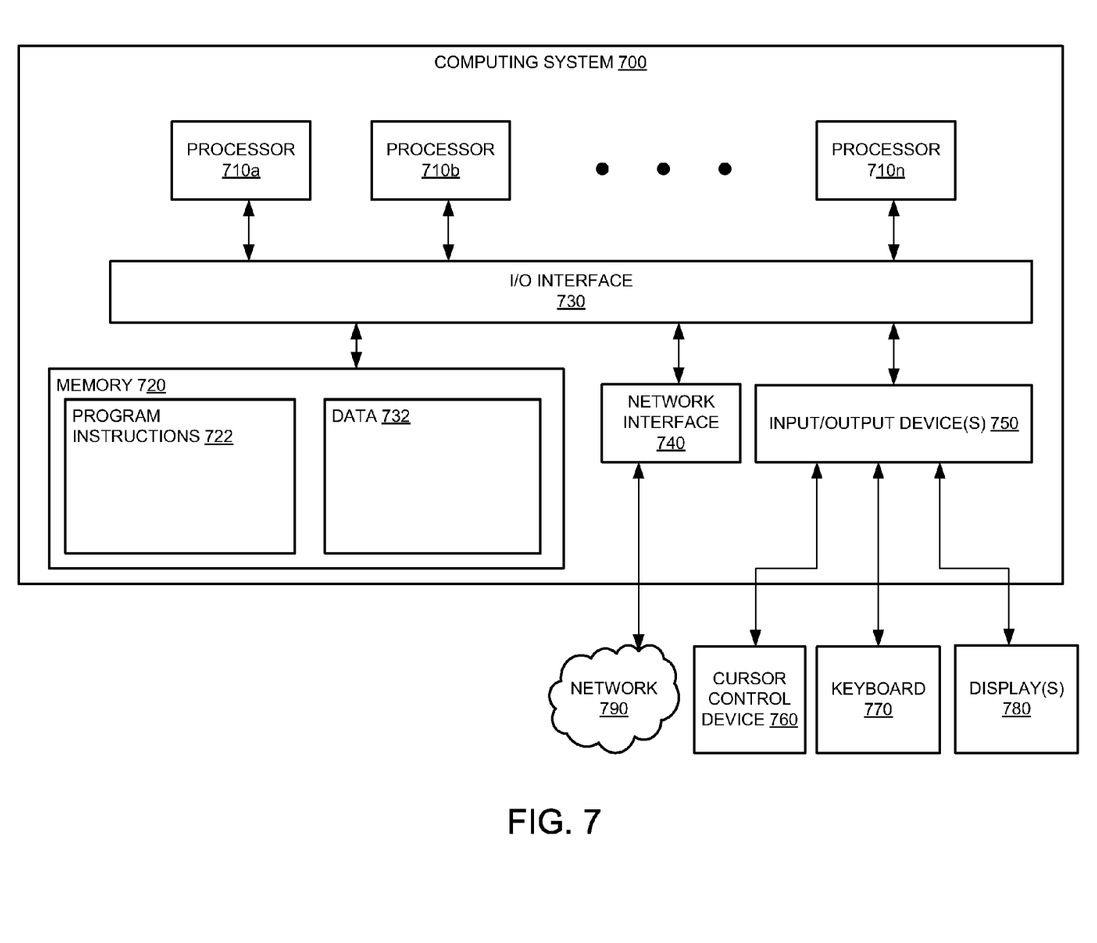
FIG. 7 is a schematic diagram of a computing system that can be used as a computer for summarizing video data according to one or more embodiments.

In the illustrated embodiment, computer system 700 includes one or more processors 710 a-n coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In various embodiments, any of components 760 or 770 may be utilized by the summarization module 112 to receive the user specifications 118 as input as described above. In various embodiments, a user interface may be generated and displayed on display 780. In some cases, it is contemplated that embodiments may be implemented using a single instance of computer system 700, while in other embodiments multiple such systems, or multiple nodes making up computer system 700, may be configured to host different portions or instances of various embodiments. For example, in one embodiment some elements may be implemented via one or more nodes of computer system 700 that are distinct from those nodes implementing other elements. In another example, multiple nodes may implement computer system 700 in a distributed manner.

In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 700 may be a uniprocessor system including one processor 710, or a multiprocessor system including several processors 740 *a-n* (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x96, PowerPC, SPARC, or MIPS ISAs, or any other suitable ISA. In multiprocessor systems, each of processors 710 may commonly, but not necessarily, implement the same ISA.

System memory 710 may be configured to store program instructions 722 and/or data 732 accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 720. In other embodiments, program instructions and/or data may be received, sent or stored upon different types of computer-accessible media or on similar media separate from system memory 720 or computer system 700.

In one embodiment, I/O interface 730 may be configured to coordinate I/O traffic between processor 710, system memory 720, and any peripheral devices in the device, including network interface 740 or other peripheral interfaces, such as input/output devices 750, In some embodiments, I/O interface 730 may perform any necessary protocol, timing or other data transformations to convert data signals from one components (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network (e.g., network 740), such as one or more external systems or between nodes of computer system 700. In various embodiments, network 740 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

In some embodiments, the illustrated computer system may implement any of the methods described above, such as the methods illustrated by the flowcharts of FIGS. 2-6. In other embodiments, different elements and data may be included.

Those skilled in the art will appreciate that computer system 700 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present disclosure, other and further embodiments of the disclosure may be devised without departing from the basic scope thereof, and the scope thereof is determined by the claims that follow.

The invention claimed is:

1. A computer implemented method of summarizing video data, comprising:
   accessing face information that is associated with at least one identified person within frames of the video data;
   examining user specifications for selecting portions of the video data, wherein the user specifications identify a selection of one or more persons of interest, and wherein the user specification comprises a user input that directly selects one or more persons of interest;
   comparing the user specifications with the face information to determine indicia of interest related to each of the frames, wherein determining indicia of interest for a frame comprises:
      calculating a base interest value for each person identified in a frame based on the identified selection of one or more persons of interest;
      applying one or more multipliers to the calculated base interest value, wherein the multipliers are based on a relative size of an area of a face to a total area of a particular frame, a distance from the face to a center of the particular frame, and temporal data, wherein the multiplier is higher for a face that appears in the middle of a video sequence than for a face that appears at a beginning or an end;
   identifying at least one of the frames that are in accordance with user specifications based on the indicia of interest; and
   forming summary video data using the at least one identified frame of the video data having a highest calculated indicia of interest.

2. The method of claim 1, wherein each of the at least one identified frame comprises at least one person of interest of the at least one identified person.

3. The method of claim 1, further comprising defining an interest value computation technique using facial attributes associated with each of the at least one identified person.

4. The method of claim 1, wherein identifying the at least one of the frames further comprises correcting at least one interest value to normalize the indicia of interest.

5. The method of claim 1, further comprising partitioning the video data into the at least one identified frame and at least one excluded frame.

6. The method of claim 5, wherein each of the at least one excluded frame comprises at least one person of the at least one identified person.

7. The method of claim 1, wherein comparing the user specifications to the face information further comprises:
   determining a base value for each of the at least one identified person within a frame of the video data;
   computing at least one modifier using facial attributes associated with each person of interest within a frame;
   applying the at least one modifier to each base value; and
   aggregating each modified base value to produce an interest value for the frame.

8. The method of claim 7 further comprising repeating the determining step, the computing step, the applying step and the aggregating step for the each frame of the video data.

9. The method of claim 1, wherein identifying the at least one of the frames further comprises determining a threshold that is based on a user-defined duration for the at least one identified frame.

10. The method of claim 9, wherein each of the at least one identified frame corresponds with an interest value that exceeds the threshold.

11. The method of claim 9 further comprising removing at least one frame from the video data in response to a comparison of a corresponding interest value to the threshold.

12. A non-transitory computer readable medium for storing software that, when executed by a computer system, causes the computing system to perform:
   accessing face information that is associated with at least one identified person within frames of the video data;
   examining user specifications for selecting portions of the video data, wherein the user specifications identify a selection of one or more persons of interest, and wherein the user specification comprises a user input that directly selects one or more persons of interest;
   comparing the user specifications with the face information to determine indicia of interest related to each of the frames, wherein determining indicia of interest for a frame comprises:
      calculating a base interest value for each person identified in a frame based on the identified selection of one or more persons of interest;
      applying one or more multipliers to the calculated base interest value, wherein the multipliers are based on a relative size of an area of a face to a total area of a particular frame, a distance from the face to a center of the particular frame, and temporal data, wherein the multiplier is higher for a face that appears in the middle of a video sequence than for a face that appears at a beginning or an end;
   identifying at least one of the frames that are in accordance with user specifications based on the indicia of interest; and
   forming summary video data using the at least one identified frame of the video data having a highest calculated indicia of interest.

13. The computer readable medium of claim 12 for storing software that, when executed by a computing system, causes the computing system to further perform correcting at least one interest value to normalize the indicia of interest.

14. The computer readable medium of claim 12 for storing software that, when executed by a computing system, causes the computing system to further perform:

determining a base value for each of the at least one identified person within a frame of the video data;
computing at least one modifier using facial attributes associated with each person of interest within a frame;
applying the at least one modifier to each base value; and
aggregating the modified base values to produce an interest value for the frame.

15. The computer readable medium of claim 14 for storing software that, when executed by a computing system, causes the computing system to further perform repeating the determining step, the computing step, the applying step and the aggregating step for the each frame of the video data.

16. The computer readable medium of claim 12 for storing software that, when executed by a computing system, causes the computing system to further perform determining a threshold that is based on a user-defined duration for the at least one identified frame.

17. The computer readable medium of claim 16 for storing software that, when executed by a computing system, causes the computing system to further perform removing at least one frame from the video data in response to a comparison of a corresponding interest value to the threshold.

18. Apparatus for summarizing video data, comprising:
a summarization module for processing the video data, accessing face information that is associated with at least one identified person within frames of the video data, examining user specifications for selecting portions of the video data, wherein the user specifications identify a selection of one or more persons of interest, and wherein the user specification comprises a user input that directly selects one or more persons of interest, comparing the user specifications with the face information to determine indicia of interest related to each of the frames, wherein determining indicia of interest for a frame comprises calculating a base interest value for each person identified in a frame based on the identified selection of one or more persons of interest, applying one or more multipliers to the calculated base interest value, wherein the multipliers are based on a relative size of an area of a face to a total area of a particular frame, a distance from the face to a center of the particular frame, and temporal data, wherein the multiplier is higher for a face that appears in the middle of a video sequence than for a face that appears at a beginning or an end, identifying at least one of the frames that are in accordance with user specifications based on the indicia of interest; and forming summary video data using the at least one identified frame of the video data having a highest calculated indicia of interest.

19. The apparatus of claim 18, wherein the summarization module implements an interest value generation technique comprising at least one modifier, wherein the at least one modifier are expressed in terms of at least one facial attribute.

20. The apparatus of claim 19, wherein the summarization module computes the at least one modifier using the face information associated with each identified person within each frame, applies the at least one modifier to a base value for the each identified person to produce an interest value for the each frame.

* * * * *